US 9,466,289 B2

United States Patent
Lu et al.

(10) Patent No.: US 9,466,289 B2
(45) Date of Patent: Oct. 11, 2016

(54) KEYWORD DETECTION WITH INTERNATIONAL PHONETIC ALPHABET BY FOREGROUND MODEL AND BACKGROUND MODEL

(71) Applicant: Tencent Technology (Shenzhen) Company Limited, Shenzhen (CN)

(72) Inventors: Li Lu, Shenzhen (CN); Xiang Zhang, Shenzhen (CN); Shuai Yue, Shenzhen (CN); Feng Rao, Shenzhen (CN); Eryu Wang, Shenzhen (CN); Lu Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 272 days.

(21) Appl. No.: 14/103,775

(22) Filed: Dec. 11, 2013

(65) Prior Publication Data
US 2014/0236600 A1 Aug. 21, 2014

Related U.S. Application Data

(63) Continuation of application No. PCT/CN2013/085905, filed on Oct. 24, 2013.

(30) Foreign Application Priority Data

Jan. 29, 2013 (CN) .......................... 2013 1 0034769

(51) Int. Cl.
*G10L 15/06* (2013.01)
*G10L 15/08* (2006.01)

(52) U.S. Cl.
CPC ............ *G10L 15/063* (2013.01); *G10L 15/08* (2013.01); *G10L 2015/088* (2013.01)

(58) Field of Classification Search
CPC ............... G10L 2015/025; G10L 2015/0631; G10L 2015/081; G10L 2015/088; G10L 15/144; G10L 15/187
USPC ....... 704/239, 240, 242, 243, 245, 254, 255, 704/257
See application file for complete search history.

(56) References Cited

U.S. PATENT DOCUMENTS 5,199,077 A 3/1993 Wilcox et al.
5,613,037 A * 3/1997 Sukkar .................. G10L 15/142
704/251

(Continued)

FOREIGN PATENT DOCUMENTS

| CN | 101231660 A | 7/2008 |
| CN | 101415259 A | 4/2009 |
| EP | 1471501 A2 | 10/2004 |

OTHER PUBLICATIONS

Zgank et al., "Crosslingual Speech Recogntiion with Multilingual Acoustic Models Based on Agglomerative and Tree-Based Triphone Clustering", Eurospeech 2001, 4 Pages.*

(Continued)

*Primary Examiner* — Martin Lerner
(74) *Attorney, Agent, or Firm* — Morgan, Lewis & Bockius LLP

(57) ABSTRACT

An electronic device with one or more processors and memory trains an acoustic model with an international phonetic alphabet (IPA) phoneme mapping collection and audio samples in different languages, where the acoustic model includes: a foreground model; and a background model. The device generates a phone decoder based on the trained acoustic model. The device collects keyword audio samples, decodes the keyword audio samples with the phone decoder to generate phoneme sequence candidates, and selects a keyword phoneme sequence from the phoneme sequence candidates. After obtaining the keyword phoneme sequence, the device detects one or more keywords in an input audio signal with the trained acoustic model, including: matching phonemic keyword portions of the input audio signal with phonemes in the keyword phoneme sequence with the foreground model; and filtering out phonemic non-keyword portions of the input audio signal with the background model.

20 Claims, 6 Drawing Sheets

(56) References Cited

U.S. PATENT DOCUMENTS

| | | | | |
|---|---|---|---|---|
| 5,675,706 A * | 10/1997 | Lee | ............ | G10L 15/04 704/254 |
| 5,737,489 A * | 4/1998 | Chou | ............ | G10L 15/063 704/232 |
| 5,797,123 A * | 8/1998 | Chou | ............ | G10L 15/18 704/240 |
| 6,125,345 A * | 9/2000 | Modi | ............ | G10L 15/10 704/232 |
| 7,149,688 B2 * | 12/2006 | Schalkwyk | ............ | G10L 15/187 704/255 |
| 9,230,541 B2 * | 1/2016 | Li | ............ | G10L 15/083 |
| 2001/0016814 A1 * | 8/2001 | Hauenstein | ............ | G10L 15/08 704/231 |
| 2004/0215454 A1 * | 10/2004 | Kobayashi | ............ | G10L 15/142 704/231 |
| 2004/0215458 A1 * | 10/2004 | Kobayashi | ............ | G10L 15/06 704/251 |
| 2006/0190259 A1 | 8/2006 | Jeong et al. | | |
| 2007/0033003 A1 * | 2/2007 | Morris | ............ | G10L 15/04 704/9 |
| 2007/0038450 A1 * | 2/2007 | Josifovski | ............ | G06F 17/30265 704/255 |
| 2007/0136058 A1 * | 6/2007 | Jeong | ............ | G10L 15/08 704/240 |
| 2007/0271241 A1 * | 11/2007 | Morris | ............ | G10L 15/26 |
| 2012/0065976 A1 * | 3/2012 | Deng | ............ | G10L 15/14 704/256.1 |
| 2012/0072215 A1 * | 3/2012 | Yu | ............ | G10L 15/14 704/240 |
| 2015/0154955 A1 * | 6/2015 | Ma | ............ | G10L 15/08 704/257 |

OTHER PUBLICATIONS

Tencent Technology, ISR, PCT/CN2013/085905, Feb. 20, 2014, 4 pgs.

Joachim Kohler, Multilingual phone models for Vocabulary-independent Speech Recognition Tasks, Speech Communication, Aug. 2001, abstract, downloaded Jul. 20, 2015, 10 pgs.

Tencent Technology, Written Opinion, PCT/CN2013/085905, Feb. 20, 2014, 6 pgs.

Tencent Technology, IPRP, PCT/CN2013/085905, Aug. 4, 2015, 7 pgs.

* cited by examiner

US 9,466,289 B2

KEYWORD DETECTION WITH INTERNATIONAL PHONETIC ALPHABET BY FOREGROUND MODEL AND BACKGROUND MODEL

RELATED APPLICATIONS

This application is a continuation application of PCT Patent Application No. PCT/CN2013/085905, entitled "METHOD AND DEVICE FOR KEYWORD DETECTION" filed on Oct. 24, 2013, which claims priority to Chinese Patent Application No. 201310034769.0, "METHOD AND DEVICE FOR KEYWORD DETECTION," filed on Jan. 29, 2013, both of which are hereby incorporated by reference in their entirety.

FIELD OF THE INVENTION

The present application relates to speech recognition technology and, more particularly, to a method and device for detecting keywords.

BACKGROUND OF THE INVENTION

Keyword detection is an important part of speech recognition, for which the greatest obstacle is the number of spoken languages. A recognition engine can achieve more accurate recognition for a specified language, leading to less accurate recognition of keyword detection for varying (or multiple) language audio.

Based on the above, a keyword detection method based on audio samples has emerged; however, such method need not specify a language of the audio to be detected. The keyword detection method based on audio samples is described as follows:

First, use the audio data of a specific languages, and, after training with the audio data, a neural network of phonetic level posterior probabilities is obtained.

Next, when an audio sample to be detected is obtained, use the neural network to obtain a characteristic sequence corresponding to the audio sample. In particular, the characteristic sequence is a representative form of the audio sample (e.g., one or more posterior probabilities are obtained from the neural network).

Finally, use a sliding window to gradually conduct the same phase shift backward on the characteristic sequence. Every time the same phase shift is conducted, continue to use the neural network to obtain a characteristic representation in each sliding window and, then, use a Dynamic Time Warping (DTW) algorithm to carry out a warp comparison. In the case of a conforming characteristic representation, output the detected keyword.

Now the description of the conventional keyword detection method based on audio sample is complete.

In the aforementioned keyword detection method based on audio samples, the characteristic representation and characteristic sequence are extracted based on the neural network with a certain robustness. In addition, this method uses the DTW algorithm in combination with the sliding window technique to detect the keyword; however, the DTW algorithm is typically used by early stage speech recognition and is mainly applicable to isolated word speech recognition. The core idea of the DTW algorithm is that based on the dynamic programming, it directly compares the audio characteristics at the characteristic level, so the realization is simple and the processing rate high.

However, due to changing external factors, such as age, emotion, environment, health, and the like, pronunciation also changes. So, with the DTW algorithm, environmental noise frequently leads to a significantly decreased keyword detection accuracy.

Moreover, with the conventional keyword detection method, the training of the neural network is based on a single language. Thus, when carrying out keyword detection on an audio sample of a specified language, the conventional keyword detection method will perform successfully; however, after extending keyword detection to other languages, it is hard to obtain equivalent keyword detection performance for audio in unspecified (e.g., non-trained) languages.

SUMMARY

In accordance with some embodiments, a method of superimposing coordinated informative materials on a web-based user interface is disclosed. The method is performed at an electronic device with one or more processors and memory. The method includes training an acoustic model with an International Phonetic Alphabet (IPA) phoneme mapping collection and a plurality of audio samples in a plurality of different languages, where the acoustic model includes: a foreground model configured to match a phoneme in an input audio signal to a corresponding keyword; and a background model configured to match a phoneme in the input audio signal to a corresponding non-keyword. After training the acoustic model, the method also includes generating a phone decoder based on the trained acoustic model. The method further includes obtaining a keyword phoneme sequence, including: collecting a set of keyword audio samples; decoding the set of keyword audio samples with the phone decoder to generate a set of phoneme sequence candidates; and selecting the keyword phoneme sequence from the set of phoneme sequence candidates. After obtaining the keyword phoneme sequence, the method includes detecting one or more keywords in the input audio signal with the trained acoustic model, including: matching one or more phonemic keyword portions of the input audio signal with one or more phonemes in the keyword phoneme sequence with the foreground model; and filtering out one or more phonemic non-keyword portions of the input audio signal with the background model.

In some embodiments, an electronic device or computer system (e.g., user device 1004, FIG. 10 or server system 1008, FIG. 10) includes one or more processors and memory storing one or more programs for execution by the one or more processors, the one or more programs include instructions for performing the operations of the methods described herein. In some embodiments, a non-transitory computer readable storage medium storing one or more programs, the one or more programs comprising instructions, which, when executed by an electronic device or computer system (e.g., user device 1004, FIG. 10 or server system 1008, FIG. 10) with one or more processors, cause the device or system to perform the operations of the methods described herein.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make a clearer understanding of purpose, technical scheme and advantages of the present application, it is described in detail below in combination with the attached figures and specific embodiments.

When detecting keywords, the method provided by the present application omits the usage of a DTW algorithm and, instead, detects keywords by utilizing an acoustic model trained in many languages, which compared to the simple DTW algorithm has significant performance advantages.

Figure 1:
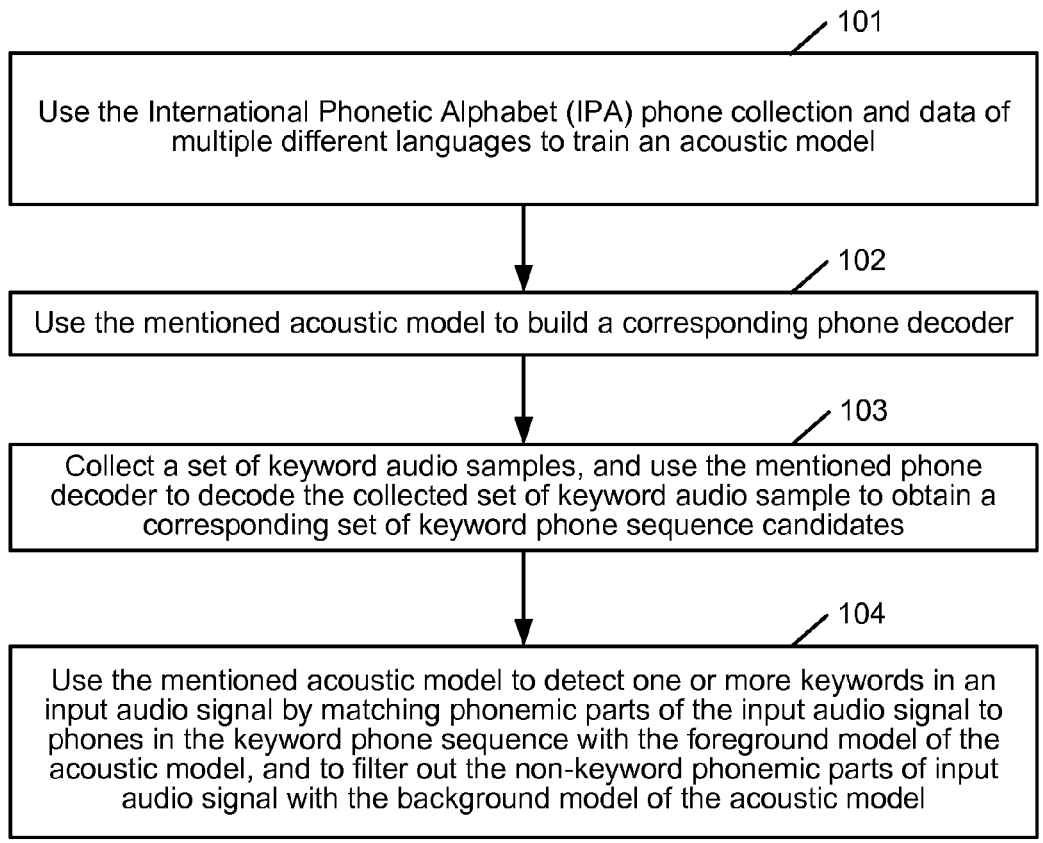
FIG. 1 is a method flowchart diagram in accordance with some embodiments.

The method provided by the present application is described as follows:

FIG. 1 is a method flowchart diagram in accordance with some embodiments. As is shown in FIG. 1, the flowchart includes the following steps:

Step 101, use an International Phonetic Alphabet (IPA) phoneme collection and audio data of multiple different languages to train an acoustic model. In some embodiments, the audio data includes a plurality of audio samples for each of a plurality of different languages. The acoustic model includes a foreground model configured to match a phoneme with a corresponding keyword and a background model configured to filter out phonemes corresponding to non-keywords.

As an embodiment of the present application, in Step 101, using the IPA phoneme mapping collection and audio data of multiple different languages to train the acoustic model includes:

Collecting audio data in multiple different languages as well as labeled data of such audio data (e.g., the labeled data includes transcriptions of the collected audio data in multiple different languages);

Obtaining a phoneme collection for each language of the multiple different languages (e.g., a phoneme collection for the English language includes 40 to 50 distinct phonemes or sounds);

Mapping the phonemes of each phoneme collection to a corresponding IPA phoneme so as to obtain the IPA phoneme mapping collection; and Training the acoustic model based on the collected audio data, labeled data of such audio data and the IPA phoneme mapping collection.

The IPA is internationally applied and has a wide coverage of phonemes. Based on this, the present application will firstly map the phonemes of different languages (e.g., Chinese, English, etc.) corresponding to the collected audio data to phonemes in the IPA so as to obtain the IPA phoneme mapping collection. The IPA phoneme mapping collection is utilized to train the acoustic model. After training the acoustic model with the IPA phoneme mapping collection, phonemes of the different languages are merged together in the acoustic model so as to realize irrelevancy between the acoustic model and the different languages to facilitate the detection of subsequent keywords.

Moreover, in the present application, the method for obtaining the IPA phoneme mapping collection can have a variety of realization methods. For example, three realization methods are mentioned as follows. The three realization methods are exemplary and are not intended to limit the present application:

Embodiment 1:

Embodiment 1 is a method based on a preset phoneme mapping rule. The phoneme mapping rule is a pronunciation rule of phonemes of various languages obtained through linguistic research. Use the pronunciation rule to build a mapping relationship between phonemes of various languages and the IPA phonemes. Based on this, Embodiment 1 directly uses the phoneme mapping rule to map the phonemes in each phoneme collection to IPA phonemes so as to obtain the IPA phoneme mapping collection.

Embodiment 2:

Embodiment 2 is a data driven method. As such, the data driven method is based on decoding a certain amount of specific language data to obtain a confusion relationship between phonemes of the specific language and IPA phonemes. If the degree of confusion between a phoneme of the specific language and IPA phoneme is greater than a first predefined threshold value, there is a mapping relationship between the two phonemes.

Embodiment 3:

In general, the data driven method based is superior to the method based on the phoneme mapping rule. So, as an embodiment of the present application, Embodiment 3 is an integration of Embodiments 1 and 2. In other words, first, build a mapping relationship between a phoneme of a language and an IPA phoneme based on the phoneme mapping rule. Then, amend the mapping relationship by using the data driven method, to obtain a preliminary mapping relationship.

Now the description of the aforementioned three embodiments is complete.

Moreover, in the present application, the training of an acoustic model based on the collected audio data of each language, labeled data of such audio data and the IPA phoneme mapping collection is described herein.

Step 102, use the acoustic model to build a corresponding phone decoder.

Step 103, collect a set of keyword audio samples, and use the phone decoder to decode the collected set of keyword audio samples to generate a corresponding set of phoneme sequence candidates.

As an embodiment of the present application, in Step 103, using the phone decoder to decode the collected keyword audio sample to obtain the corresponding set of phoneme sequence candidates includes:

Determining the number of audio samples in the collected set of keyword audio samples;

When the set of keyword audio samples includes one collected keyword audio sample, confirm the sole phoneme sequence obtained after decoding the one collected keyword audio sample as the keyword phoneme sequence; and When the set of keyword audio samples includes two or more keyword audio samples, select one of the set of phoneme sequence candidates as the keyword phoneme sequence (e.g., the preferred pronunciation for the set of keyword audio samples). The selection process is described in more detail below with respect to FIGS. 6-8. For example, the selected phoneme sequence candidate is stored in a pronunciation library of preferred pronunciations for enhanced keyword detection.

Step 104, use the acoustic model to detect (or recognize) one or more keywords in an input audio signal by matching phonemic parts of the input audio signal to phonemes in the keyword phoneme sequence with the foreground model of the acoustic model and by filtering out non-keyword phonemic parts of the input audio signal with the background model of the acoustic model.

Figure 2:
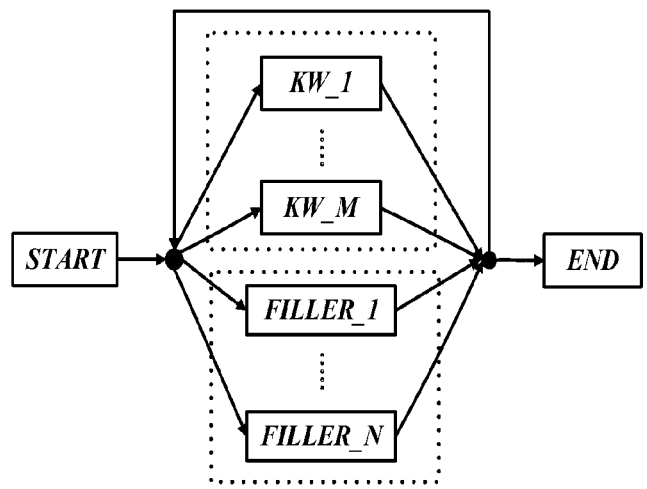
FIG. 2 is a schematic diagram of a keyword retrieval model in accordance with some embodiments.

As an embodiment of the present application, based on the acoustic model a keyword retrieval model as shown in FIG. 2 is constructed. As shown in FIG. 2, this keyword retrieval model includes a foreground model network and a background model network. In the foreground model network, KW_1 to KW_N indicate the phonemes of the keyword phoneme sequence. In the background model network, FILLER_1 to FILLER_N indicate all the phonemes of the background model. When the phonemes to be detected (e.g., phonemes of an input audio signal) enter the model shown in FIG. 2, a phoneme containing a keyword is detected by the foreground model network and the non-keyword parts are filtered out (or detected) by the background model network so as to realize keyword spotting.

Figure 3:
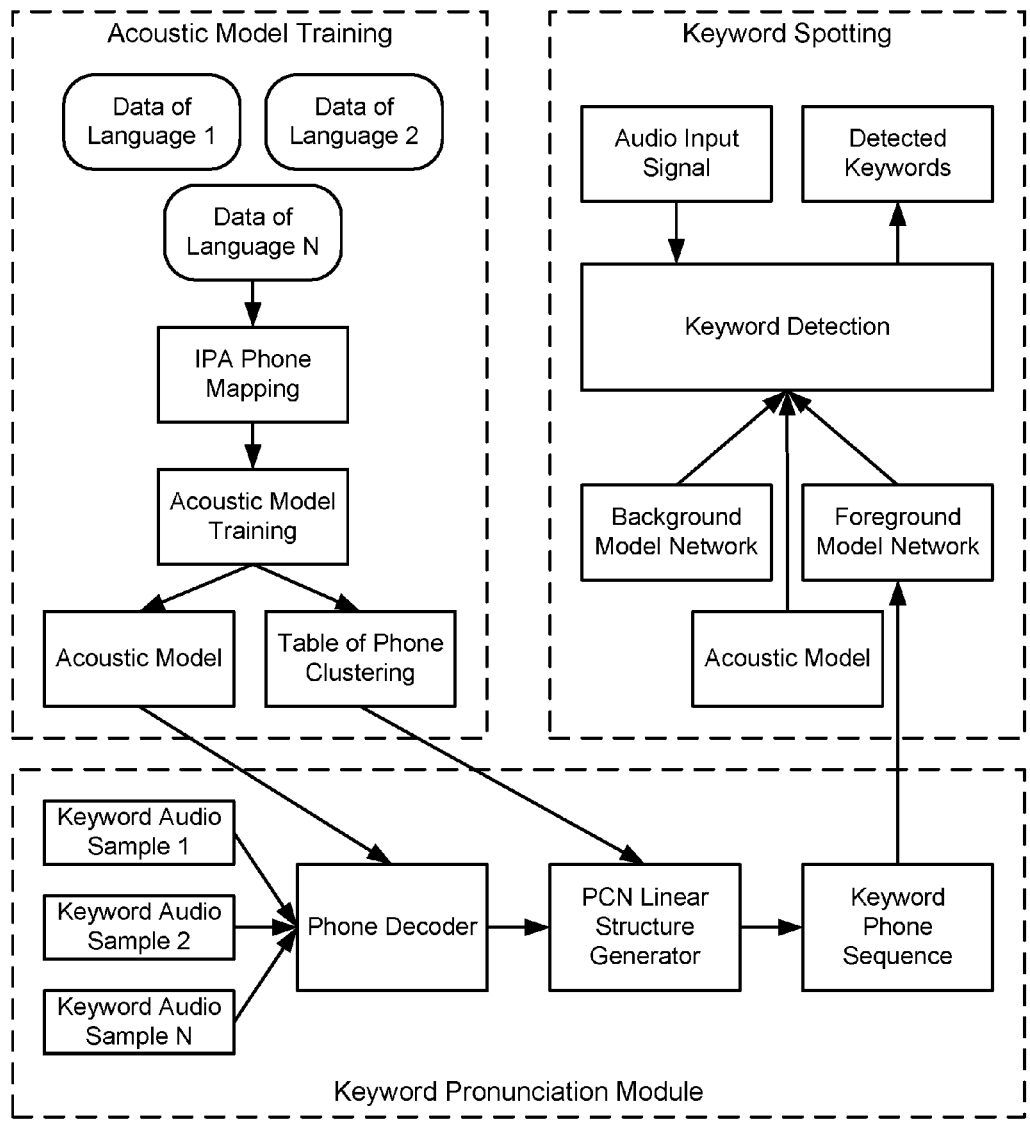
FIG. 3 is a framework schematic diagram in accordance with some embodiments.

Now the description of the flowchart shown in FIG. 1 is complete. Corresponding to the flowchart shown in FIG. 1, the present application provides a corresponding framework schematic diagram, as shown in FIG. 3.

In the above description, as an embodiment, training an acoustic model based on the collected audio data of each language, labeled data of such audio data and the IPA phoneme mapping collection includes:

Carrying out a characteristic extraction process on the collected audio data of each language to obtain corresponding audio characteristic sequences. The characteristic extraction method may be performed according to a variety of predetermined protocols such as perceptual linear predictive (PLP) data, or Mel Frequency Cepstrum Coefficient (MFCC) data, etc. However, the present application does not specifically limit the characteristic extraction protocol;

Obtaining a characteristic phoneme collection corresponding to the audio characteristic sequences based on the IPA phoneme mapping collection;

Using the characteristic phoneme collection and the collected labeled data to train the foreground and background models; and Combining the foreground and background models to form the acoustic model.

Figure 4:
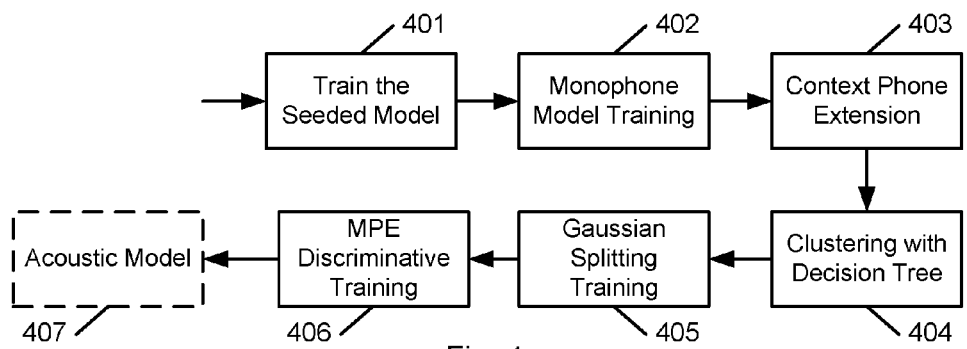
FIG. 4 is a foreground model training flowchart diagram in accordance with some embodiments.

The following focuses on training the foreground and background models:

Foreground Model Training:

FIG. 4 is a flowchart diagram of foreground model training in accordance with some embodiments. As is shown in FIG. 4, the flowchart includes the following steps:

Step 401, train the seeded model.

Figure 5:
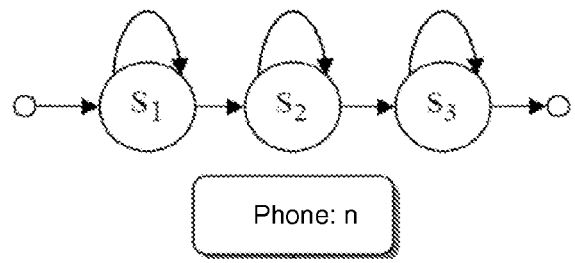
FIG. 5 is a structural schematic diagram of a hidden Markov model in accordance with some embodiments.

Training the seeded model includes training the initial hidden Markov model (HMM) for the three statuses of each phoneme in the characteristic phoneme collection. In other words, after performing Step 401, every phoneme in the characteristic phoneme collection is associated with a HMM. FIG. 5 illustrates an exemplary topological structure of the HMM. In FIG. 5, the HMM for a respective phoneme includes three statuses (or states) in temporal order (e.g., S1, S2, S3).

For each status of a respective phoneme, the emission probability of a phoneme is estimated by using a Gaussian Mixture Model (GMM), which is represented by the following formula:

$$p(\vec{x}|\lambda) = \sum_{i=1}^{M} p_i b_i(\vec{x}) \quad \text{(Formula 1)}$$

With respect to formula 1, $\vec{x}$ is a characteristic vector corresponding to a phoneme, $b_i(\vec{x})$ is a Gaussian distribution, and $p_i$ is the weight of the i-th Gaussian distribution. Ensure that $$\sum_{i=1}^{M} p_i = 1.$$

Each of the Gaussian distributions is expressed by the following formula:

$$b_i(\vec{x}) = \frac{1}{(2\pi)^{D/2}|\Sigma_i|^{1/2}} \exp\left\{-\frac{1}{2}(\vec{x}-\vec{\mu}_i)' \sum_i^{-1} (\vec{x}-\vec{\mu}_i)\right\} \quad \text{(Formula 2)}$$

With respect to formula 2, $\vec{\mu}_i$ and $\Sigma_i$ are mean and variance values for the i-th Gaussian distribution, respectively.

Step 402, monophone model training.

In Step 402, for every phoneme in the characteristic phoneme collection, obtain data related to such phoneme from the collected labeled data and use such obtained data to update the initial HMM to generate a monophone model.

Step 403, context phoneme extension.

Step 403 is performed in consideration of changing vocal characteristics of the speaker. Every spoken phoneme is related to a context phoneme and adopting the monophone is inadequate to describe the spoken phoneme. So, in Step 403, for every phoneme in the characteristic phoneme collection, obtain a context phoneme and, then, generate a corresponding triphone. In other words, change the previously generated monophone into the triphone by linking the context phoneme to the monophone.

Step 404, clustering the triphone with a decision tree.

In Step 404, the status of each triphone is clustered with a decision tree, and by such clustering, it can appropriately decrease the complexity of the subsequently generated triphone model.

Step 405, Gaussian splitting training.

After clustering the triphone, Gaussian splitting training is performed on the clustered triphone to update a parameter corresponding to the triphone. Gaussian splitting training is well known in the art and is not fully discussed for sake of brevity.

Step 406, after Gaussian splitting training, perform Minimum Phone Error (MPE) discriminative training on the clustered triphone so as to generate a triphone model. MPE discriminative training is well known in the art and is not fully discussed for sake of brevity.

Step 407, based on the monophone and triphone models train the foreground model.

Now the description of the flowchart shown in FIG. 4 is complete. Before describing training of the background model, the confusion matrix related to the background model is described as follows:

In the present application, based on the monophone model trained in FIG. 4, a Gaussian Mixture Model (GMM) distance between two monophone models is calculated, so as to obtain a confusion matrix between similar phonemes. The confusion matrix clusters phonemes with a high degree of similarity.

Among which, as an embodiment of the present application, a realization for obtaining the confusion matrix follows the steps of:

After calculating the GMM distance between two random monophone models, compare the calculated GMM distance with a predefined secondary threshold value. If the calculated GMM distance is larger than the predefined secondary threshold value, the monophones corresponding to the two monophone models are considered to be similar. Then, cluster the similar monophones and record the similar monophones in the confusion matrix. For example, after calculating the GMM distance between two monophone models b and p, if the calculated GMM distance is greater than the predefined secondary threshold value, record b and p in the confusion matrix. Again, in this example, after calculating the GMM distance between two monophone models d and t, if the calculated GMM distance is greater than the predefined secondary threshold value, record d and t in the confusion matrix. In this example, the confusion matrix is represented by the following:

$$\begin{vmatrix} b & p \\ d & t \end{vmatrix}$$

Now the description of the confusion matrix is complete.

Background Model Training:

In the present application, background model training is achieved by processing the phonemes in the characteristic phoneme collection (e.g., used for training the foreground model) with the confusion matrix. Use the confusion matrix to process the phonemes in the characteristic phoneme collection, so that a phoneme in the characteristic phoneme collection can be substituted with a corresponding confusion phoneme to obtain the confusion phoneme collection. Then, use the confusion phoneme collection to train the background model.

As can be seen, background model training is based on a more coarse-grained phoneme model which blurs the pronunciation personality of some monophones in contrast to the foreground model. As such, the background model avoids filtering out keywords based on varying pronunciation so as to increase the recall rate of keyword spotting.

The above describes training the foreground and background models related to the present application.

Figure 6:
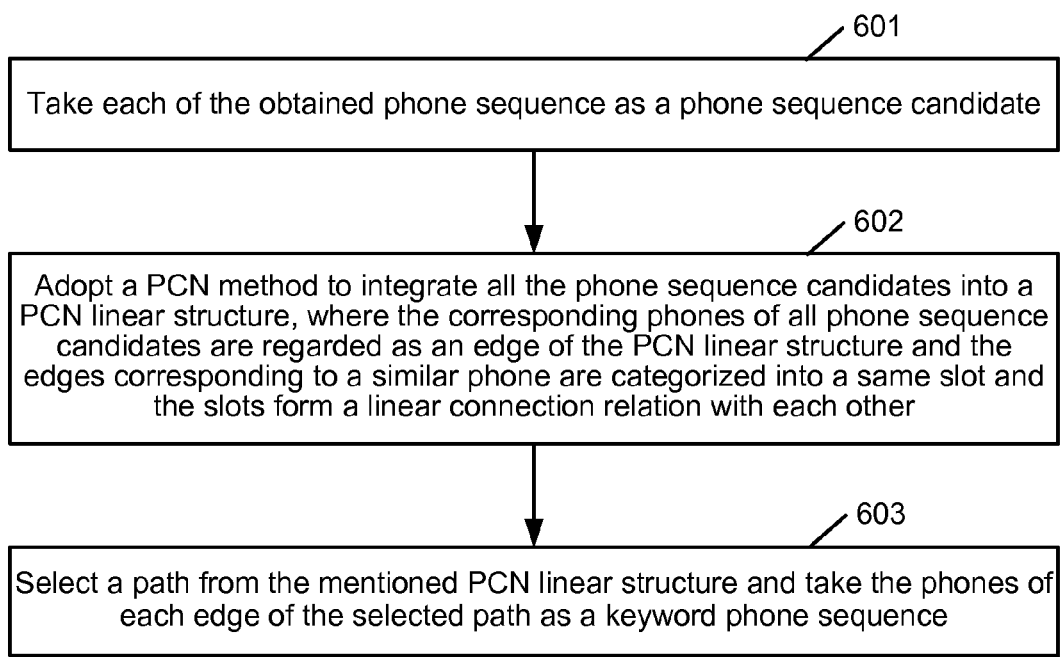
FIG. 6 is a flowchart diagram for determining the keyword phoneme sequence in accordance with some embodiments.

The following describes how to select one of the generated phoneme sequence candidates as a keyword phoneme sequence when the set of collected audio samples includes two or more audio samples:

FIG. 6 is a flowchart diagram for determining the keyword phoneme sequence in accordance with some embodiments. As is shown in FIG. 6, the flowchart includes the following steps:

Step 601, take each of the phoneme sequences generated after decoding the set of audio samples with the phone decoder as a phoneme sequence candidate.

For example, when using the Cantonese word for "management committee," ten different keyword audio samples used to describe this word are collected. In this example, after decoding the keyword audio samples, ten different phoneme sequences are obtained (e.g., as shown below in Table 1).

TABLE 1

| Quantity | Phone sequence |
|---|---|
| 1 | c au w ai w un |
| 2 | c ok w ai w ui |
| 3 | c ak w ai w ui |
| 4 | c t au w ai w ui |
| 5 | h au w aai ei w ui |
| 6 | k au w ai w un |
| 7 | t au w ai w ui |
| 8 | t au w ai w ui |
| 9 | au w aai ei w un |
| 10 | k au w ai w aan |

It can be seen that the ten phoneme sequences shown in Table 1 are different from each other, but also have a degree of similarity. Here, the obtained ten phoneme sequences are temporarily called phoneme sequences candidates.

Step 602, adopt a PCN method to integrate all the phoneme sequence candidates into a PCN linear structure. The corresponding phonemes of all phoneme sequence candidates are regarded as an edge of the PCN linear structure. Edges corresponding to a similar phoneme are categorized into a same slot, and the slots form a linear connection relation with each other.

Based on the phoneme sequence candidates, if all the phoneme sequence candidates are directly detected, a significant increase of false alarms will be caused due to a high degree of confusion. This is because the correct pronunciation of each word only corresponds to one or two phoneme sequences (e.g., when a word has more than one pronunciation). So, the present application adopts the PCN method to integrate the phoneme sequence candidates to form the PCN linear structure of the confusion matrix.

As an embodiment of the present application, generating the PCN linear structure includes:

First, select a phoneme sequence candidate meeting predefined criteria as a benchmark (e.g., the longest phoneme sequence candidate or the phoneme sequence candidate with the most phonemes), and take the other phoneme sequence candidates as benchmark candidates.

Next, calculate a minimum editing distance between the benchmark and benchmark candidates according to a dynamic programming method. As such, when calculating the minimum editing distance, the confusion matrix is taken into account, specifically: align two phoneme sequence candidates vertically so as to merge similar phonemes into one slot. As one example, use Table 1 to generate the PCN linear structure shown in FIG. 7.

Figure 7:
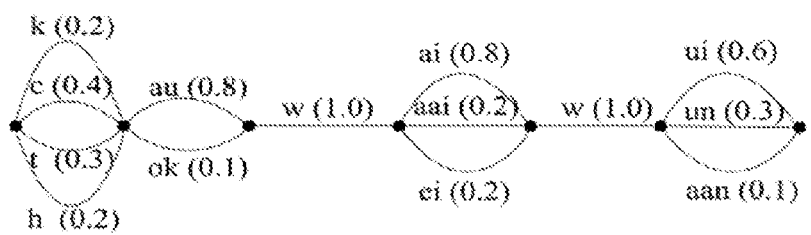
FIG. 7 is a schematic diagram of a phoneme confusion network (PCN) linear structure in accordance with some embodiments.

For the PCN linear structure shown in FIG. 7, each edge corresponds to a phoneme. For example, when considering the degree of similarity between phonemes k, c, t and h, it is found that the phonemes have a high degree of similarity and the phonemes are subsequently clustered into a same category. Continuing with this example, the corresponding edges of phonemes k, c, t and h are categorized in a same slot. This principle is performed for the other phonemes of the phoneme sequence candidates. Thus, many slots are formed in FIG. 7, and the slots are connected linearly.

Step 603, select a path from the PCN linear structure and take the phonemes of each edge of the selected path as a keyword phoneme sequence candidate.

Figure 8:
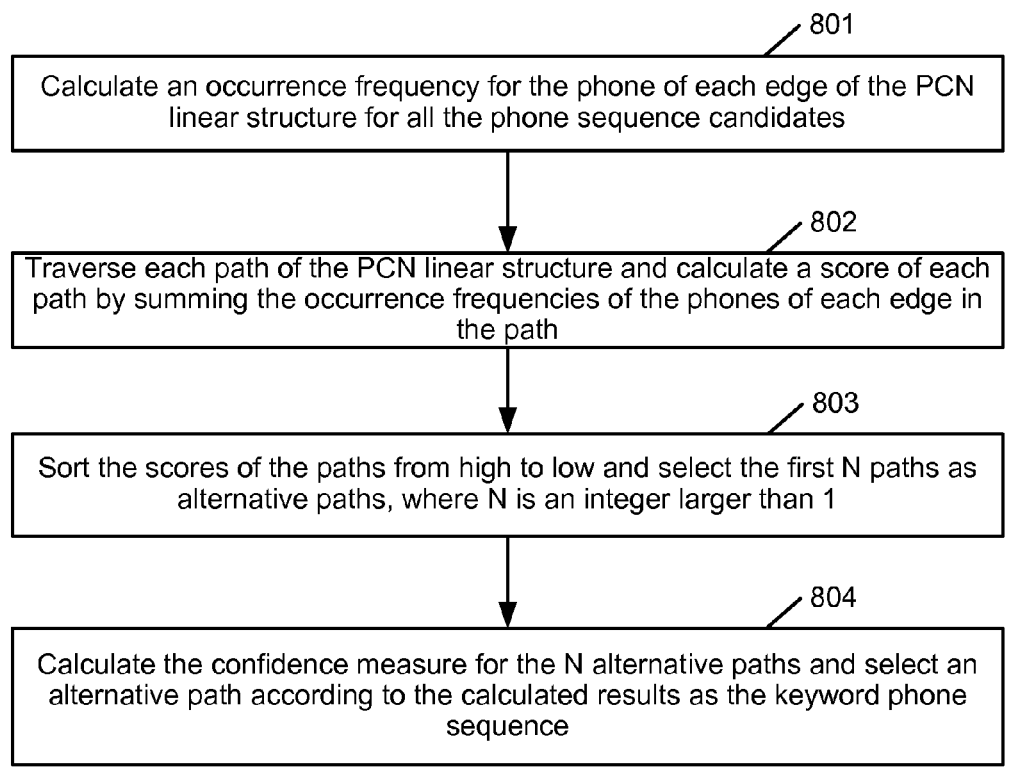
FIG. 8 is a flowchart diagram of Step 603, FIG. 6 in accordance with some embodiments.

As an embodiment of the present application, Step 603 is realized as the flowchart shown in FIG. 8.

FIG. 8 is a flowchart diagram of Step 603 in accordance with some embodiments. As shown in FIG. 8, the flowchart includes the following steps:

Step 801, calculate an occurrence frequency for the phoneme of each edge of the PCN linear structure for all phoneme sequence candidates. For example, k (0.2) indicates the occurrence frequency of phoneme k for all the phoneme sequence candidates in Table 1. In this example, k is present in 20% of the phoneme sequence candidates.

Step 802, traverse each path of the PCN linear structure, and calculate a score of each path by summing the occurrence frequencies of the phonemes corresponding to each edge in the path.

For example, there exist 48 possible paths for the PCN linear structure shown in FIG. 7. Based on this, Step 802 can rely on the occurrence frequency of phonemes corresponding to each edge in the path to calculate the score of each path.

Step 803, sort the scores of the paths (e.g., calculated in Step 802) from high to low, and select the first N paths as alternative paths, where N is an integer larger than 1. For example, N is typically an integer between 3 and 6. In some embodiments, N is a predetermined integer value.

Step 804, calculate the confidence measure of the N alternative paths, and select an alternative path according to the calculated results as the keyword phoneme sequence.

In some embodiments, Step 804 is implemented as follows:

For each alternative path, calculate a plurality of intermediate confidence measures for a respective alternative path by force aligning the respective alternative path with each phoneme sequence candidate;

After force aligning the respective alternative path with all the phoneme sequence candidates, the confidence measure for the respective alternative path is calculated by averaging the plurality of intermediate confidence measures; and Select the alternative path with the highest confidence measure, and take the phonemes corresponding to the edges of the selected alternative path as the keyword phoneme sequence.

In some embodiments, the confidence measure algorithm of the present application can be a confidence measure of the acoustic model, a confidence measure of the neural network, or the combination of many confidence measures. However, the present application is not specifically limited.

In the following example, only the acoustic model confidence measure is used:

First, align all phoneme sequence candidates with each alternative path. Then, calculate the corresponding acoustic model confidence measure. The algorithm for confidence measure of the acoustic model is divided into two phases: one is a phonemic level confidence measure calculation; and the other is a keyword level confidence measure calculation.

The phonemic level confidence measure is calculated by the following formula:

$$CM(ph_i) = \frac{1}{e[i] - b[i] + 1} \sum_{n=b[i]}^{e[i]} \log p(q^{(n)} | o^{(n)}) \quad \text{(Formula 3)}$$

$$= \frac{1}{e[i] - b[i] + 1} \sum_{n=b[i]}^{e[i]} \log p \frac{p(o^{(n)} | q^{(n)}) p(q^{(n)})}{p(o^{(n)})}$$

The keyword level confidence measure is calculated by the following formula:

$$CM(w) = \frac{1}{m} \sum_{i=1}^{m} CM(ph_i) \quad \text{(Formula 4)}$$

With respect to formulas 3 and 4, b[i] and e[i] are the start and end frames, respectively, of a respective phoneme sequence $ph_i$, $o^{(n)}$ represents the phoneme sequence corresponding to the alternative path, and $q^{(n)}$ represents the status sequence of each phoneme of the alternative path. Finally, m represents the number of phonemes contained in the alternative path.

Based on the phonemic level confidence measure, select the alternative path with the highest value confidence measure and take the phonemes corresponding to the edges of the selected alternative path as the keyword phoneme sequence, which can be realized by the following formula:

$$Tr(w_i) = \arg\max_{Tr_p(w_i)} \frac{1}{N(S(w_i))} \sum_{j} CM(Tr_p(w_i) | S_j(w_i)) \quad \text{(Formula 5)}$$

With respect to formula 5, $Tr_p(w_i)$ represents the keyword phoneme sequence of the i-th pronunciation sequence, $S_j(w_i)$ represents the j-th phoneme sequence candidate, and $N(S(w_i))$ represents the number of phoneme sequence candidates.

With formula 5, calculate the confidence measure for each alternative path (e.g., by averaging a plurality of intermediate confidence measure values), and select the alternative path with the highest score, which can be considered as the most correspondent alternative path and as the preferred pronunciation of the set of collected keyword audio samples.

Figure 9:
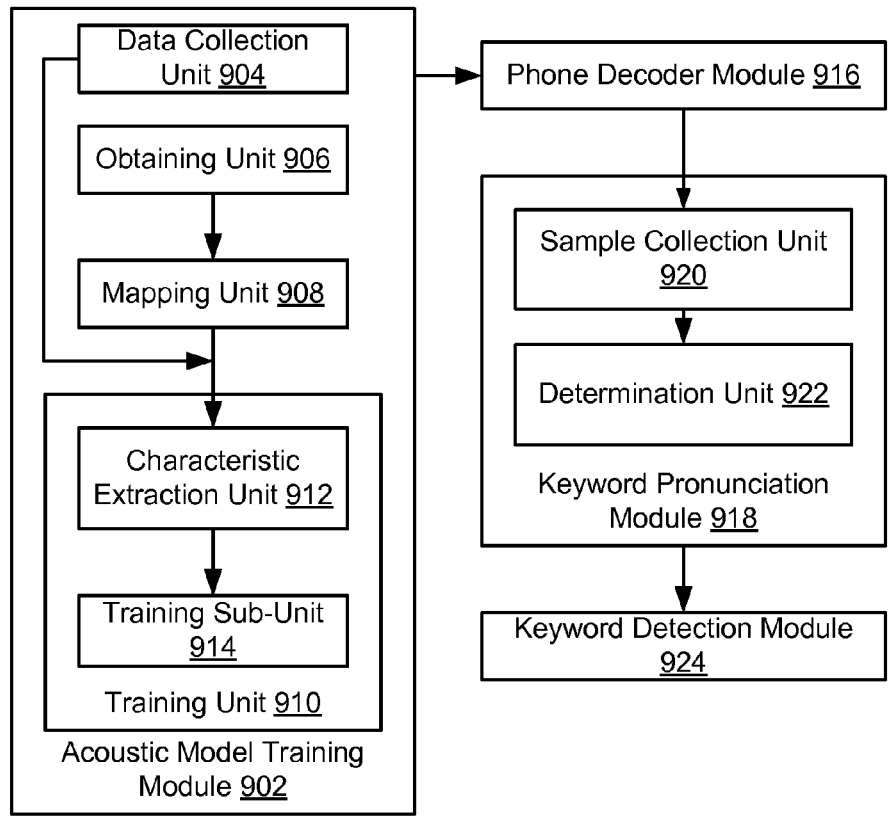
FIG. 9 is a structural schematic diagram in accordance with some embodiments.

This completes the description of the method provided by the present application has been finished. The following is the description of apparatus provided by the present application:

FIG. 9 is a structural schematic diagram of an electronic device for keyword detection in accordance with some embodiments. As is shown in FIG. 9, the device includes:

Acoustic model training module 902 configured to train an acoustic model based on an IPA phoneme collection and audio data of multiple different languages. The acoustic models includes a foreground model configured to match phonemes with corresponding keywords and a background model configured to filter out phonemes corresponding to non-keywords;

Phone decoder module 916, where the phone decoder is built with the acoustic model;

Keyword pronunciation module 918 configured to collect keyword audio samples and also configured to use the phone decoder to decode the collected keyword audio samples to obtain corresponding keyword phoneme sequence candidates; and Keyword detection module 924 configured to recognize keywords in an input audio signal with the acoustic model by matching phonemic parts of the input audio signal to phonemes in the keyword phoneme sequence with the foreground model of the acoustic model and by filtering out non-keyword phonemic parts of the input audio signal with the background model of the acoustic model.

Preferably, as is shown in FIG. 9, acoustic training module 902 of the present application includes:

Data collection unit 904 configured to collect audio data of multiple different languages as well as labeled data of such audio data;

Obtaining unit 906 configured to obtain a phoneme collection for each language of the said multiple different languages;

Mapping unit 908 configured to map the phonemes from each phoneme collection to an IPA phoneme so as to obtain the IPA phoneme mapping collection; and Training unit 910 configured to train an acoustic model based on the collected audio data of each language, labeled data of such audio data and the IPA phoneme mapping collection.

In some embodiments, training unit 910 includes:

Characteristic extracting unit 912 configured to obtain audio characteristic sequences by extracting the characteristics from the collected audio data of each language, and obtaining a characteristic phoneme collection corresponding to the audio characteristic sequences based on the IPA phoneme mapping collection; and Training sub-unit 914 configured to train the foreground and background models with the characteristic phoneme collection and the collected labeled data and also configured to combine the foreground model and background models to form the acoustic model.

In some embodiments, training sub-unit 914 is configured to train the foreground model by the following steps:

For each phoneme in the characteristic phoneme collection, train an initial HMM corresponding to a respective phoneme in the characteristic phoneme collection for the three statuses of the respective phoneme. Obtain data related to the respective phoneme from the collected labeled data and use the obtained data to update the initial HMM for the respective phoneme so as to generate a monophone model for the respective phoneme;

For each phoneme in the characteristic phoneme collection, obtain a context phoneme corresponding to a respective phoneme and, then, generate a triphone for the respective phoneme. In other words, change the previously generated monophone into the triphone by linking the context phoneme to the monophone.

The statuses (or states) of each obtained triphone are clustered by a decision tree to update a parameter of the triphone; then, perform minimum phoneme error (MPE) discriminative training on the clustered triphone to generate a triphone model; and Based on the monophone and triphone models train the foreground model.

In the present application, further calculate a Gaussian mixture model (GMM) distance between two monophone models with the training sub-unit. Compare the calculated GMM distance with a predefined secondary threshold value. If the calculated GMM distance is larger than the predefined secondary threshold value, the monophones corresponding to the two monophone models are considered to be similar. Then, cluster similar monophones and record the similar monophones in a confusion matrix used for describing similar phonemes.

In some embodiments, training sub-unit 914 is configured to train the background model by the following steps:

Process the phonemes in the characteristic phoneme collection (e.g., used in training the foreground model) with the confusion matrix to substitute similar phonemes in the characteristic phoneme collection with a corresponding confusion phoneme to obtain the confusion phoneme collection; and Then, train the background model with the obtained confusion phoneme collection.

In the present application, as is shown in FIG. 9, keyword pronunciation module 918 includes:

Sample collection unit 920 configured to collect a set of keyword audio samples; and Determination unit 922 configured to decode the set of collected keyword audio samples with phone decoder 916 to generate a set of phoneme sequence candidates. When the set of keyword audio samples collected by sample collection unit 920 includes one keyword audio sample, confirm the sole phoneme sequence candidate obtained after decoding as the keyword phoneme sequence. When the set of keyword audio samples collected by sample collection unit 920 includes two or more keyword audio samples, select one of the phoneme sequence candidates as the keyword phoneme sequence.

In some embodiments, selecting one of the obtained phoneme sequence candidates as the keyword phoneme sequence with determination unit 922, includes:

Take each of the obtained phoneme sequences as a phoneme sequence candidate;

Adopt a PCN method to integrate all the phoneme sequence candidates into a PCN linear structure. The corresponding phonemes of all phoneme sequence candidates are regarded as an edge of the PCN linear structure. Edges corresponding to a similar phoneme are categorized into a same slot, and the slots form a linear connection relation with each other; and Select a path from the PCN linear structure according to a confidence measure calculation and take the phonemes of each edge of the selected path as the keyword phoneme sequence (e.g., the preferred pronunciation corresponding to the keyword audio samples).

This completes the description of the apparatus shown in FIG. 9.

As is shown in the above technical scheme, instead of using the DTW algorithm, the present application trains the acoustic model with audio data of different languages and an IPA phoneme collection. The acoustic model merges the phonemes of each language so as to truly realize irrelevancy between the acoustic model and the different languages.

Thus, compared to the pure DTW algorithm, keyword detection based on the acoustic model trained based on the different languages has significant advantages and can increase the detection accuracy of keywords.

Figure 10:
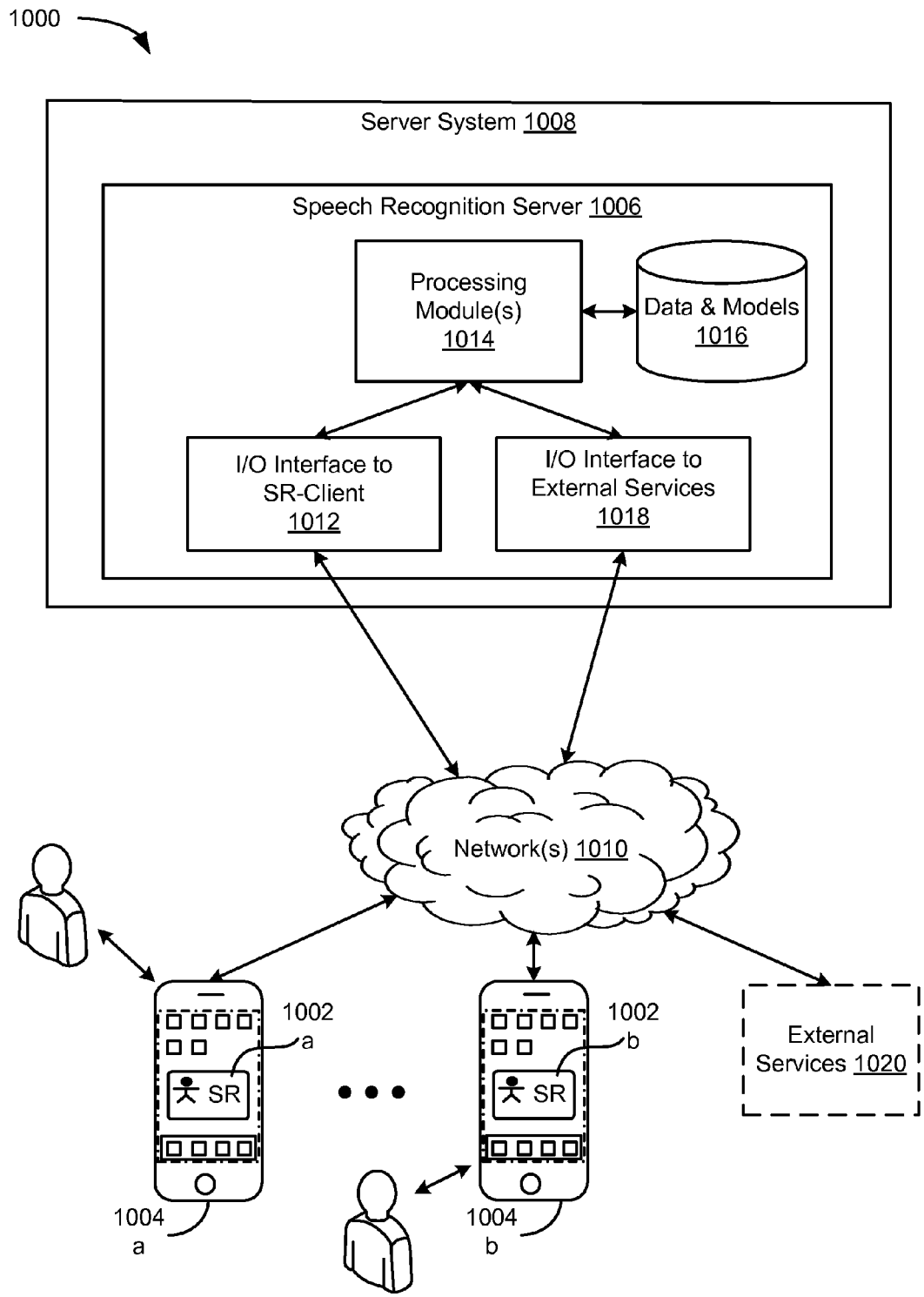
FIG. 10 is a diagram of a client-server environment in accordance with some embodiments.

As shown in FIG. 10, in some embodiments, speech recognition (e.g., including keyword detection or spotting) is implemented according to client-server model 1000. The speech recognition includes a client-side portion 1002a, 1002b (hereinafter "SR-client 1002") executed on a user device 1004a, 1004b, and a server-side portion 1006 (hereinafter "SR-server 1006") executed on a server system 1008. SR-client 1002 communicates with SR-server 1006 through one or more networks 1010. SR-client 1002 provides client-side functionalities such as user-facing input and output processing and communications with SR-server 1006. SR-server 1006 provides server-side functionalities for any number of SR-clients 1002 each residing on a respective user device 1004.

In some embodiments, SR-server 1006 includes an I/O interface to SR-client 1012, one or more processing modules 1014, data and models 1016, and an I/O interface to external services 1018. I/O interface to SR-client 1012 facilitates the client-facing input and output processing for SR-server 1006. One or more processing modules 1014 utilize data and models 1016 (e.g., one or more acoustic models, keyword phoneme sequences, and grammar and language models) to perform speech recognition on an audio signal (e.g., the voice of a user of user device 1004) received from a SR-client 1002. In some embodiments, SR-server 1006 communicates with external services 1020 through one or more networks 1010 for information acquisition and other services. I/O interface to external services 1018 facilitates such communications.

Examples of user device 1004 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 1010 include local area networks ("LAN") and wide area networks ("WAN") such as the Internet. Communication network(s) 1010 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 1008 is implemented on one or more standalone data processing apparatuses or a distributed network of computers. In some embodiments, server system 1008 also employs various virtual devices and/or services of third party service providers (e.g., third-party cloud service providers) to provide the underlying computing resources and/or infrastructure resources of server system 1008.

Although client-server model 1000 shown in FIG. 10 includes both a client-side portion (e.g., SR-client 1002) and a server-side portion (e.g., SR-server 1006), in some embodiments, speech recognition is implemented as a standalone application installed on user device 1004. In addition, the division of functionalities between the client and server portions of speech recognition can vary in different embodiments. For example, in some embodiments, SR-client 1002 is a thin-client that provides only user-facing input and output processing functions, and delegates all other speech recognition functionalities to a backend server (e.g., server system 1008).

Figure 11:
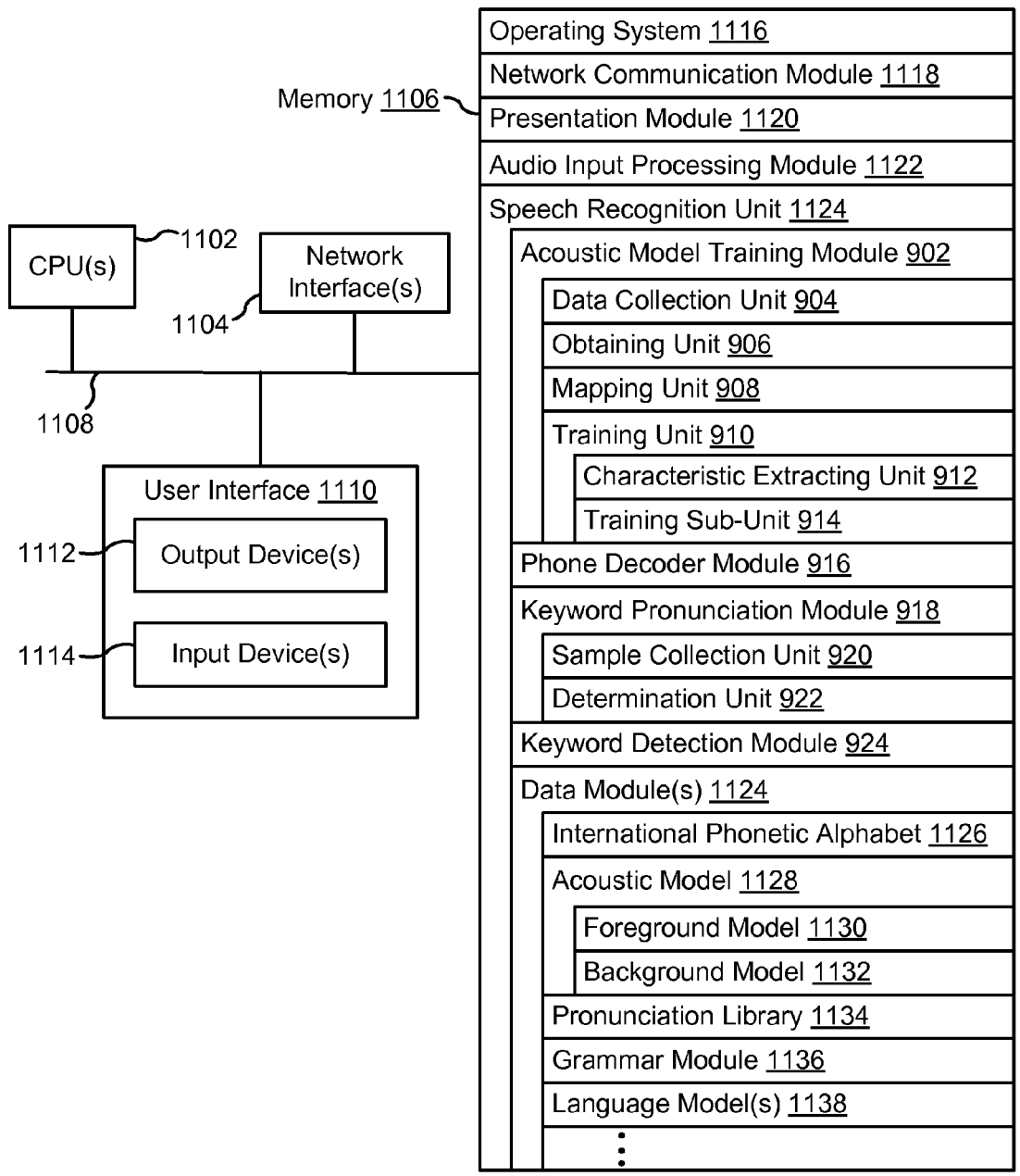
FIG. 11 is a diagram of an example electronic device in accordance with some embodiments.

FIG. 11 is a block diagram illustrating an electronic device 1100 (e.g., user device 1004 or server system 1008, or a combination thereof) in accordance with some embodiments. In some embodiments, electronic device 1100, typically, includes one or more processing units (CPUs) 1102 one or more network interfaces 1104, memory 1106, and one or more communication buses 1108 for interconnecting these components (sometimes called a chipset). Electronic device 1100 also includes a user interface 1110. User interface 1110 includes one or more output devices 1112 that enable presentation of media content, including one or more speakers and/or one or more visual displays (e.g., a touch screen display). User interface 1110 also includes one or more input devices 1114, including user interface components that facilitate user input such as a keyboard, a mouse, a voice-command input unit or microphone, a touch sensitive display (e.g., a touch screen display), a touch-sensitive input pad, a gesture capturing camera, or other input buttons or controls. Furthermore, some electronic devices 1100 use a microphone and voice recognition or a camera and gesture recognition to supplement or replace the keyboard. Memory 1106 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1106, optionally, includes one or more storage devices remotely located from CPU(s) 1102. Memory 1106, or alternately the non-volatile memory device(s) within memory 1106, includes a non-transitory computer readable storage medium. In some implementations, memory 1106, or the non-transitory computer readable storage medium of memory 1106, stores the following programs, modules, and data structures, or a subset or superset thereof:

- an operating system 1116 including procedures for handling various basic system services and for performing hardware dependent tasks;
- a network communication module 1118 for connecting electronic device 1100 to other computers connected to one or more networks 1010 via one or more communication network interfaces 1104 (wired or wireless);
- a presentation module 1120 configured to enable presentation of information or media content (e.g., text, audio, video, etc.) via one or more output devices 1112 (e.g., displays, speakers, etc.) associated with user interface 1110; and
- an audio input processing module 1122 configured to receive and process input audio signals (e.g., speech input from a user of client device 1004, FIG. 10).

In some implementations, memory 1106, or the non-transitory computer readable storage medium of memory 1106, also stores a speech recognition unit 1124 (e.g., SR-server 1006 or SR-client 1002, or a combination thereof) for converting portions of the input audio signals received by audio input processing module 1122 to text, including the following programs, modules, and data structures, or a subset or superset thereof:

- acoustic model training module 902 configured to train acoustic model 1128, including:

data collection unit 904 configured to collect audio data of multiple different languages as well as labeled data of such audio data;

obtaining unit 906 configured to obtain a phoneme collection for each language of the said multiple different languages;

mapping unit 908 configured to map the phonemes from each phoneme collection to an IPA phoneme so as to obtain the IPA phoneme mapping collection; and training unit 910 configured to combine foreground model 1130 and background model 1132 to generate acoustic model 1128, including:

characteristic extracting unit 912 configured to obtain audio characteristic sequences by extracting characteristics from audio data of each language and to generated a characteristic phoneme collection corresponding to the audio characteristic sequences based on the IPA phoneme mapping collection; and training sub-unit 914 configured to train the foreground model 1130 and background model 1132 with the characteristic phoneme collection generated by characteristic extracting unit 912 and the collected labeled data;

keyword pronunciation module 918 configured to generate keyword phoneme sequences, including sample collection unit 920 configured to collect a set of keyword audio samples;

phone decoder module 916 configured to decode the set of keyword audio samples collected by sample collection module 918 to generate a set of phoneme sequence candidates; and determination unit 922 configured to select one of the set of phoneme sequence candidates as a keyword phoneme sequence;

keyword detection module 924 configured to detect keywords in the input audio signals received with audio input processing module 1122 using acoustic model 1128; and data modules 1124 configured to store data related to speech recognition unit 1124, including:

the international phonetic library 1126;

acoustic model 1128 configured to store statistical representations (e.g., hidden Markov models) of each of the phonemes in the IPA phoneme mapping collection for speech recognition, including:

foreground model 1130 configured to match phonemic parts of the input audio signals received with audio input processing module 1122 to phonemes in the keyword phoneme sequence (or pronunciation library 1134); and background model 1132 configured to filter out non-keyword phonemic parts of the input audio signals received with audio input processing module 1122;

pronunciation library 1134 configured to store one or more keyword phoneme sequences (e.g., the preferred pronunciation of a set keyword audio samples collected by sample collection unit 920) generated by keyword pronunciation module 918;

a grammar module 1136 configured to store a plurality of words and matching transcriptions for the plurality of different languages; and one or more language models 1138 for the plurality of different languages.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting keywords, comprising:
at an electronic device with one or more processors and memory:
training an acoustic model with an International Phonetic Alphabet (IPA) phoneme mapping collection and a plurality of audio samples in a plurality of different languages, wherein the acoustic model includes:
a foreground model configured to match a phoneme in an input audio signal to a corresponding keyword, wherein the foreground model is trained by (i) obtaining a phoneme collection for each of the plurality of different languages, (ii) generating a plurality of triphones by linking phonemes in the phoneme collection corresponding to the language, and (iii) performing Gaussian splitting training on the triphones that are clustered with a decision tree corresponding to the language; and
a background model configured to match a phoneme in the input audio signal to a corresponding non-keyword;
after training the acoustic model, generating a phone decoder based on the trained acoustic model;
obtaining a keyword phoneme sequence for a respective keyword in a respective language of the plurality of different languages, including:
collecting a set of keyword audio samples for the respective keyword in the respective language;
decoding the set of keyword audio samples with the phone decoder to generate a set of phoneme sequence candidates for the respective keyword, each phoneme sequence candidate corresponding to a respective keyword audio sample; and
selecting the keyword phoneme sequence for the respective keyword from the set of phoneme sequence candidates by choosing a phoneme of a highest confidence measure from one of the set of phoneme sequence candidates at each location in the corresponding sequence and assembling the chosen phonemes into the keyword phoneme sequence according to their locations in the corresponding sequence;
after obtaining the keyword phoneme sequence, detecting one or more keywords in the input audio signal with the trained acoustic model, including:
matching one or more phonemic keyword portions of the input audio signal with one or more phonemes in the keyword phoneme sequence with the foreground model; and
filtering out one or more phonemic non-keyword portions of the input audio signal with the background model.

2. The method of claim 1, wherein selecting the keyword phoneme sequence from the set of phoneme sequence candidates includes:
in accordance with a determination that the set of keyword audio samples includes one collected keyword audio sample, selecting the phoneme sequence candidate generated from decoding the one collected keyword audio sample as the keyword phoneme sequence; and
in accordance with a determination that the set of audio samples includes two or more collected keyword audio samples, selecting one of the two or more phoneme sequence candidates generated from decoding the two or more collected keyword audio samples as the keyword phoneme sequence.

3. The method of claim 1, further including:
collecting the plurality of audio samples in the plurality of different languages and labeled data for the plurality of audio samples;
mapping phonemes from each phoneme collection to phonemes in the IPA so as to generate the IPA phoneme mapping collection; and
wherein the acoustic model is trained based on the collected plurality of audio samples in the plurality of different languages, the collected labeled data for the plurality of audio samples, and the generated IPA phoneme mapping collection.

4. The method of claim 3, further including:
processing the collected plurality of audio samples with a predetermined characteristic extraction protocol so as to obtain a plurality of corresponding audio characteristic sequences;
obtaining a characteristic phoneme collection corresponding to the plurality of audio characteristic sequences based on the IPA phoneme mapping collection;
training the foreground and background models based on the characteristic phoneme collection and the collected labeled data; and
integrating the trained foreground and background models into the acoustic model.

5. The method of claim 4, wherein:
generating the plurality of triphones by linking phonemes in the phoneme collection corresponding to the language includes, for each phoneme in the phoneme collection:
obtaining a context phoneme; and
generating a triphone by linking the context phoneme to a corresponding monophone for the phoneme;
performing Gaussian splitting training on the triphones that are clustered with the decision tree corresponding to the language updates a parameter of the clustered triphone; and
training the foreground model further includes:
for each phoneme in the characteristic phoneme collection:
training an initial hidden Markov model (HMM) for three statuses of a respective phoneme in the characteristic phoneme collection;
obtaining data related to the respective phoneme from the collected labeled data;
updating the initial HMM with the obtained data so as to obtain a monophone model for the respective phoneme; and
after performing the Gaussian splitting training on the triphones that are clustered with a decision tree corresponding to the language, performing minimum phoneme error discriminative training so as to obtain triphone models for respective phonemes in the phoneme collection corresponding to the language; and
training the foreground model based on the obtained monophone and triphone models.

6. The method of claim 5, further including:
calculating a Gaussian Mixed Model (GMM) distance between two monophone models;
comparing the calculated GMM distance with a predefined similarity threshold value; and
in accordance with a determination that the calculated GMM distance is larger than the predefined similarity threshold value:
  clustering the two monophones corresponding to the two monophone models; and
  recording the two monophones in a confusion matrix, wherein the confusion matrix is configured to describe similar monophones.

7. The method of claim 6, wherein training the background model includes:
generating a confusion phoneme collection by processing the phonemes in the characteristic phoneme collection with the confusion matrix; and
training the background model with the generated confusion phoneme collection.

8. The method of claim 1, wherein:
the set of audio samples includes two or more collected keyword audio samples; and
the set of phoneme sequence candidates generated from decoding the two or more collected keyword audio samples include two or more phoneme sequence candidates; and
the method including:
  integrating the phoneme sequence candidates into a linear structure, including:
    mapping the corresponding phonemes of the phoneme sequence candidates to an edge of the linear structure; and
    categorizing the edges corresponding to similar phonemes into a same slot of the linear structure, wherein the slots form a linear connection relation with each other; and
  selecting a path of the linear structure, wherein the phonemes corresponding to the edges of the selected path comprise the keyword phoneme sequence.

9. The method of claim 8, wherein selecting the path from the linear structure includes:
calculating an occurrence frequency for the phoneme corresponding to each edge of the linear structure;
calculating a score for each path of the linear structure by summing the occurrence frequencies of the phonemes corresponding to each edge in a respective path;
sorting the scores for the paths of the linear structure from high to low, and selecting the first N paths as alternative paths, wherein N is an integer larger than 1; and
calculating a confidence measure for each of the N alternative paths, and selecting one of the N alternative paths according to corresponding calculated confidences measures, wherein the phonemes corresponding to the edges of the selected one of the N alternative paths comprise the keyword phoneme sequence.

10. The method of claim 9, wherein calculating the confidence measure for each of the N alternative paths includes:
for each of the N alternative paths:
  aligning a respective alternative path with each of the phoneme sequence candidates and calculating an intermediate confidence measure; and
  after aligning the respective alternative path with each of the phoneme sequence candidates, calculating the average of the intermediate confidence measures, wherein the average of the calculated intermediate confidence measures is the confidence measure for the alternative path; and
wherein selecting one of the N alternative paths includes selecting the alternative path with the highest confidence measure, wherein the phonemes corresponding to the edges of the selected alternative path with the highest confidence measure comprise the keyword phoneme sequence.

11. An electronic device, comprising:
one or more processors; and
memory storing one or more programs to be executed by the one or more processors, the one or more programs comprising instructions for:
  training an acoustic model with an International Phonetic Alphabet (IPA) phoneme mapping collection and a plurality of audio samples in a plurality of different languages, wherein the acoustic model includes:
    a foreground model configured to match a phoneme in an input audio signal to a corresponding keyword, wherein the foreground model is trained by (i) obtaining a phoneme collection for each of the plurality of different languages, (ii) generating a plurality of triphones by linking phonemes in the phoneme collection corresponding to the language, and (iii) performing Gaussian splitting training on the triphones that are clustered with a decision tree corresponding to the language; and
    a background model configured to match a phoneme in the input audio signal to a corresponding non-keyword;
  after training the acoustic model, generating a phone decoder based on the trained acoustic model;
  obtaining a keyword phoneme sequence for a respective keyword in a respective language of the plurality of different languages, including:
    collecting a set of keyword audio samples for the respective keyword in the respective language;
    decoding the set of keyword audio samples with the phone decoder to generate a set of phoneme sequence candidates for the respective keyword, each phoneme sequence candidate corresponding to a respective keyword audio sample; and
    selecting the keyword phoneme sequence for the respective keyword from the set of phoneme sequence candidates by choosing a phoneme of a highest confidence measure from one of the set of phoneme sequence candidates at each location in the corresponding sequence and assembling the chosen phonemes into the keyword phoneme sequence according to their locations in the corresponding sequence;
  after obtaining the keyword phoneme sequence, detecting one or more keywords in the input audio signal with the trained acoustic model, including:
    matching one or more phonemic keyword portions of the input audio signal with one or more phonemes in the keyword phoneme sequence with the foreground model; and
    filtering out one or more phonemic non-keyword portions of the input audio signal with the background model.

12. The device of claim 11, wherein selecting the keyword phoneme sequence from the set of phoneme sequence candidates includes:

in accordance with a determination that the set of keyword audio samples includes one collected keyword audio sample, selecting the phoneme sequence candidate generated from decoding the one collected keyword audio sample as the keyword phoneme sequence; and in accordance with a determination that the set of audio samples includes two or more collected keyword audio samples, selecting one of the two or more phoneme sequence candidates generated from decoding the two or more collected keyword audio samples as the keyword phoneme sequence.

13. The device of claim 11, wherein the one or more programs comprising instructions for:

collecting the plurality of audio samples in the plurality of different languages and labeled data for the plurality of audio samples;

obtaining a phoneme collection for each of the plurality of different languages;

mapping phonemes from each phoneme collection to phonemes in the IPA so as to generate the IPA phoneme mapping collection; and wherein the acoustic model is trained based on the collected plurality of audio samples in the plurality of different languages, the collected labeled data for the plurality of audio samples, and the generated IPA phoneme mapping collection.

14. The device of claim 13, wherein the one or more programs comprising instructions for:

processing the collected plurality of audio samples with a predetermined characteristic extraction protocol so as to obtain a plurality of corresponding audio characteristic sequences;

obtaining a characteristic phoneme collection corresponding to the plurality of audio characteristic sequences based on the IPA phoneme mapping collection;

training the foreground and background models based on the characteristic phoneme collection and the collected labeled data; and integrating the trained foreground and background models into the acoustic model.

15. The device of claim 11, wherein:

the set of audio samples includes two or more collected keyword audio samples; and the set of phoneme sequence candidates generated from decoding the two or more collected keyword audio samples include two or more phoneme sequence candidates; and the method including:
integrating the phoneme sequence candidates into a linear structure, including:
mapping the corresponding phonemes of the phoneme sequence candidates to an edge of the linear structure; and
categorizing the edges corresponding to similar phonemes into a same slot of the linear structure, wherein the slots form a linear connection relation with each other; and
selecting a path of the linear structure, wherein the phonemes corresponding to the edges of the selected path comprise the keyword phoneme sequence.

16. A non-transitory computer readable storage medium storing one or more programs, the one or more programs comprising instructions, which, when executed by an electronic device with one or more processors, cause the device to:

train an acoustic model with an International Phonetic Alphabet (IPA) phoneme mapping collection and a plurality of audio samples in a plurality of different languages, wherein the acoustic model includes:
a foreground model configured to match a phoneme in an input audio signal to a corresponding keyword, wherein the foreground model is trained by (i) obtaining a phoneme collection for each of the plurality of different languages, (ii) generating a plurality of triphones by linking phonemes in the phoneme collection corresponding to the language, and (iii) performing Gaussian splitting training on the triphones that are clustered with a decision tree corresponding to the language; and
a background model configured to match a phoneme in the input audio signal to a corresponding non-keyword;

after training the acoustic model, generate a phone decoder based on the trained acoustic model;

obtain a keyword phoneme sequence for a respective keyword in a respective language of the plurality of different languages, wherein the obtaining includes:
collecting a set of keyword audio samples for the respective keyword in the respective language;
decoding the set of keyword audio samples with the phone decoder to generate a set of phoneme sequence candidates for the respective keyword, each phoneme sequence candidate corresponding to a respective keyword audio sample; and
selecting the keyword phoneme sequence for the respective keyword from the set of phoneme sequence candidates by choosing a phoneme of a highest confidence measure from one of the set of phoneme sequence candidates at each location in the corresponding sequence and assembling the chosen phonemes into the keyword phoneme sequence according to their locations in the corresponding sequence;

after obtaining the keyword phoneme sequence, detect one or more keywords in the input audio signal with the trained acoustic model, wherein the detecting includes:
matching one or more phonemic keyword portions of the input audio signal with one or more phonemes in the keyword phoneme sequence with the foreground model; and
filtering out one or more phonemic non-keyword portions of the input audio signal with the background model.

17. The non-transitory computer readable storage medium of claim 16, wherein selecting the keyword phoneme sequence from the set of phoneme sequence candidates includes:

in accordance with a determination that the set of keyword audio samples includes one collected keyword audio sample, selecting the phoneme sequence candidate generated from decoding the one collected keyword audio sample as the keyword phoneme sequence; and in accordance with a determination that the set of audio samples includes two or more collected keyword audio samples, selecting one of the two or more phoneme sequence candidates generated from decoding the two or more collected keyword audio samples as the keyword phoneme sequence.

18. The non-transitory computer readable storage medium of claim 16, wherein the one or more programs comprising instructions, which further cause the device to:

collect the plurality of audio samples in the plurality of different languages and labeled data for the plurality of audio samples;

obtain a phoneme collection for each of the plurality of different languages;

map phonemes from each phoneme collection to phonemes in the IPA so as to generate the IPA phoneme mapping collection; and wherein the acoustic model is trained based on the collected plurality of audio samples in the plurality of different languages, the collected labeled data for the plurality of audio samples, and the generated IPA phoneme mapping collection.

19. The non-transitory computer readable storage medium of claim 18, wherein the one or more programs comprising instructions, which further cause the device to:

processing the collected plurality of audio samples with a predetermined characteristic extraction protocol so as to obtain a plurality of corresponding audio characteristic sequences;

obtaining a characteristic phoneme collection corresponding to the plurality of audio characteristic sequences based on the IPA phoneme mapping collection;

training the foreground and background models based on the characteristic phoneme collection and the collected labeled data; and integrating the trained foreground and background models into the acoustic model.

20. The non-transitory computer readable storage medium of claim 16, wherein:

the set of audio samples includes two or more collected keyword audio samples;

the set of phoneme sequence candidates generated from decoding the two or more collected keyword audio samples include two or more phoneme sequence candidates; and the one or more programs comprising instructions, which further cause the device to:

integrate the phoneme sequence candidates into a linear structure, wherein the integrating includes:

mapping the corresponding phonemes of the phoneme sequence candidates to an edge of the linear structure; and categorizing the edges corresponding to similar phonemes into a same slot of the linear structure, wherein the slots form a linear connection relation with each other; and select a path of the linear structure, wherein the phonemes corresponding to the edges of the selected path comprise the keyword phoneme sequence.

\* \* \* \* \*